US008606507B2

(12) United States Patent
Lee et al.

(10) Patent No.: US 8,606,507 B2
(45) Date of Patent: Dec. 10, 2013

(54) PORTABLE ELECTRONIC DEVICE AND PANORAMA NAVIGATION METHOD USING THE PORTABLE ELECTRONIC DEVICE

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 209 days.

(21) Appl. No.: 13/249,263

(22) Filed: Sep. 30, 2011

(65) Prior Publication Data

US 2012/0191339 A1    Jul. 26, 2012

(30) Foreign Application Priority Data

Jan. 24, 2011  (TW) .............................. 100102433 A

(51) Int. Cl.
*G01C 21/00* (2006.01)
(52) U.S. Cl.
USPC ........... 701/410; 701/412; 701/418; 701/428; 340/995.12
(58) Field of Classification Search
USPC ........... 701/25, 400, 410, 412, 418, 428, 436; 340/988, 991, 995.12
See application file for complete search history.

(56) References Cited

U.S. PATENT DOCUMENTS

| 6,064,399 | A | * | 5/2000 | Teo ................................ 345/629 |
| 6,083,353 | A | * | 7/2000 | Alexander, Jr. ............... 202/158 |
| 6,816,782 | B1 | * | 11/2004 | Walters et al. ................ 701/426 |
| 6,850,844 | B1 | * | 2/2005 | Walters et al. ................ 701/410 |
| 7,013,216 | B2 | * | 3/2006 | Walters et al. ................ 701/423 |
| 7,062,374 | B1 | * | 6/2006 | Walters et al. ................ 701/491 |
| 7,990,390 | B2 | * | 8/2011 | Law et al. ..................... 345/506 |
| 2009/0202102 | A1 | * | 8/2009 | Miranda et al. ............... 382/100 |
| 2010/0250120 | A1 | * | 9/2010 | Waupotitsch et al. ........ 701/207 |

* cited by examiner

*Primary Examiner* — Gertrude Arthur Jeanglaude
(74) *Attorney, Agent, or Firm* — Altis Law Group, Inc.

(57) ABSTRACT

In a panorama navigation method using a portable electronic device, the portable electronic device includes a GPS, an electronic compass and a touch screen. A user operation interface is displayed on the touch screen, and driving information is received from a user operation interface when a driver arranges a driving route in a geographic region. The driving route is marked on an electronic map of the geographic region according to the driving information. The GPS detects a current location of a vehicle, and the electronic compass identifies a driving direction of the vehicle. The portable electronic device obtains a series of panoramic images of the geographic region from a host computer according to the current location, the driving direction and a current time of the vehicle, and displays each of the panoramic images on the touch screen to provide panoramic navigation information for the driver.

16 Claims, 6 Drawing Sheets

# PORTABLE ELECTRONIC DEVICE AND PANORAMA NAVIGATION METHOD USING THE PORTABLE ELECTRONIC DEVICE

BACKGROUND

1. Technical Field

The embodiments of the present disclosure relate to navigation systems and methods, and more particularly to a portable electronic device and a panorama navigation method using the portable electronic device.

2. Description of Related Art

Navigation systems can provide ways for navigating maps and/or geographic images. Many navigation systems, however, fail to provide a user with sufficient panoramic navigation information of a geographic region. The panoramic navigation information may include points of interests, such as businesses, facilities, restaurants, hotels, airports, gas stations, stadiums, or police stations. Without sufficient panoramic navigation information, the user can lose his or her orientation of the geographic region while navigating. Therefore, a more panorama navigation system and method to provide sufficient panoramic navigation information is desired.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
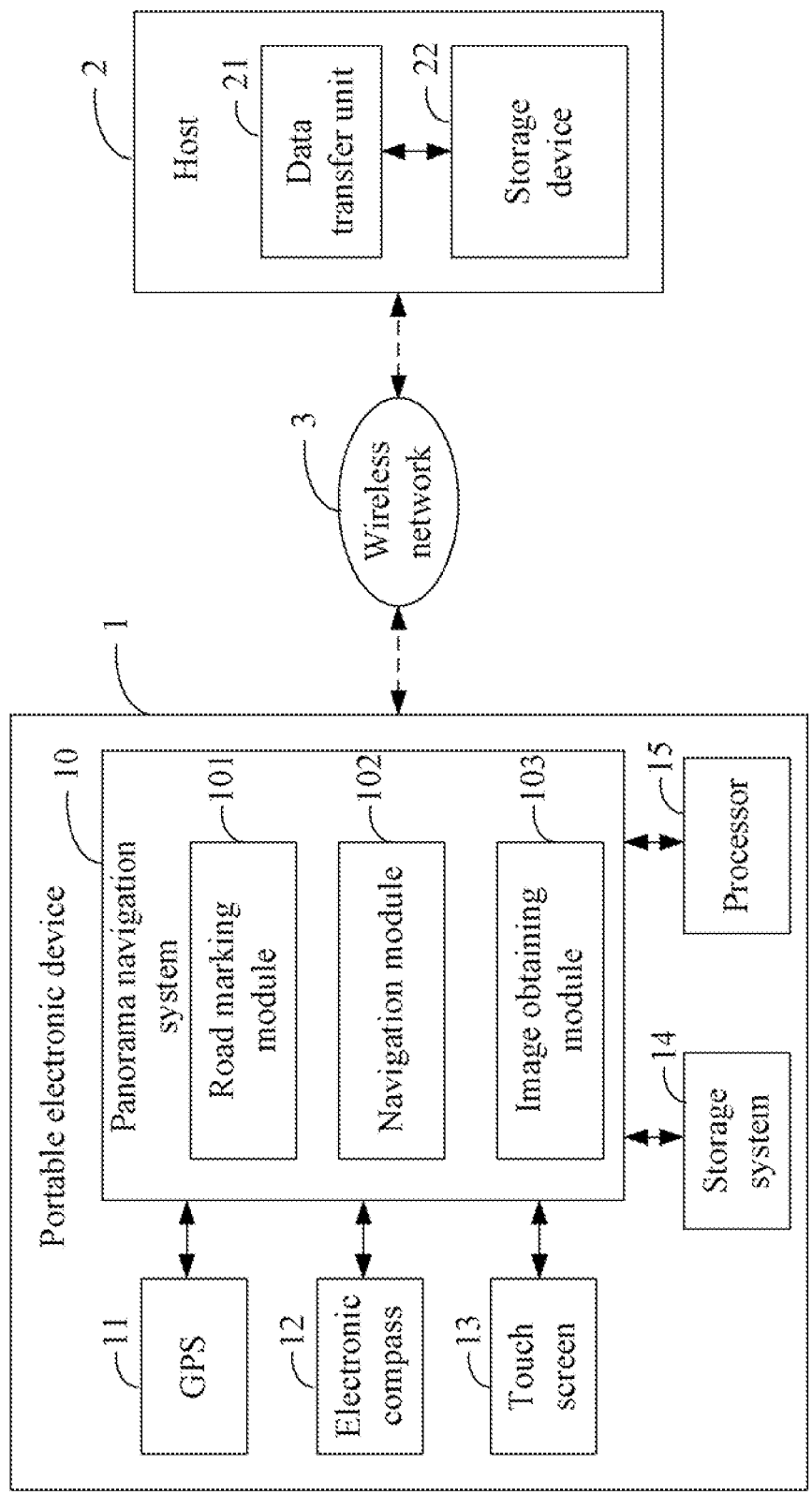
FIG. 1 is a block diagram of one embodiment of a portable electronic device including a panorama navigation system.

FIG. 1 is a block diagram of one embodiment of a portable electronic device 1 including a panorama navigation system 10. In the embodiment, the panorama navigation system 10 may include a plurality of functional modules that are implemented by the portable electronic device 1 to provide sufficient panoramic information of a geographic region when a driver drives a vehicle within the geographic region. The panoramic information may include points of interests, such as businesses, facilities, restaurants, hotels, airports, gas stations, stadiums, and police stations, for example.

The portable electronic device 1 may be a mobile phone, a personal digital assistant (PDA), a notebook, or other portable computing device. The portable electronic device 1 may further includes a global position system (GPS) 11, an electronic compass 12, a touch screen 13, a storage system, and at least one processor 15. It is understood that FIG. 1 is only one example of the portable electronic device 1 that can include more or fewer components than those shown in the embodiment, or a different configuration of the various components.

The GPS 11 is configured to detect a current location of the vehicle by collecting geographic information of the geographic region. The geographic information include longitudinal and latitudinal information of the geographic region. The electronic compass 12 is configured to identify a driving direction of the vehicle by detecting an orientation of portable electronic device 1, such as eastward, southward, westward, or northward. The touch screen 13 is configured to sense a touch operation when a finger of the driver or a stylus contacts with the surface of the touch screen 13, and display a series of panoramic images of the geographic region according to the current location of the vehicle. In the embodiment, each of the panoramic images may be a whole image that reflects the actual scene around 360 degrees of the geographic region. The touch operation may be input of data when the driver arranges a driving route on the geographic region, such as a departure and a destination of the driving route.

The panorama navigation system 10 includes computerized instructions in the form of one or more programs that are stored in the storage system 14 and executed by the at least one processor 15. In one embodiment, the storage system 14 may be an internal storage system, such as a random access memory (RAM) for the temporary storage of information, and/or a read only memory (ROM) for the permanent storage of information. In some embodiments, the storage system 14 may also be an external storage system, such as an external hard disk, a storage card, or a data storage medium.

The portable electronic device 1 can be placed inside a driving cab of a vehicle (e.g. a car, or a bus), and communicates with a host computer 2 through a wireless network 3, such as WLAN, WMAN or a WIFI network. In the embodiment, the host computer 2 may include a data transfer unit 21 and a storage device 22. The data transfer unit 21 is configured to receive the information of the driving route from the portable electronic device 1 through the wireless network 3, and send the series of panoramic images of the geographic region to the portable electronic device 1 through the wireless network 3.

Figure 2:
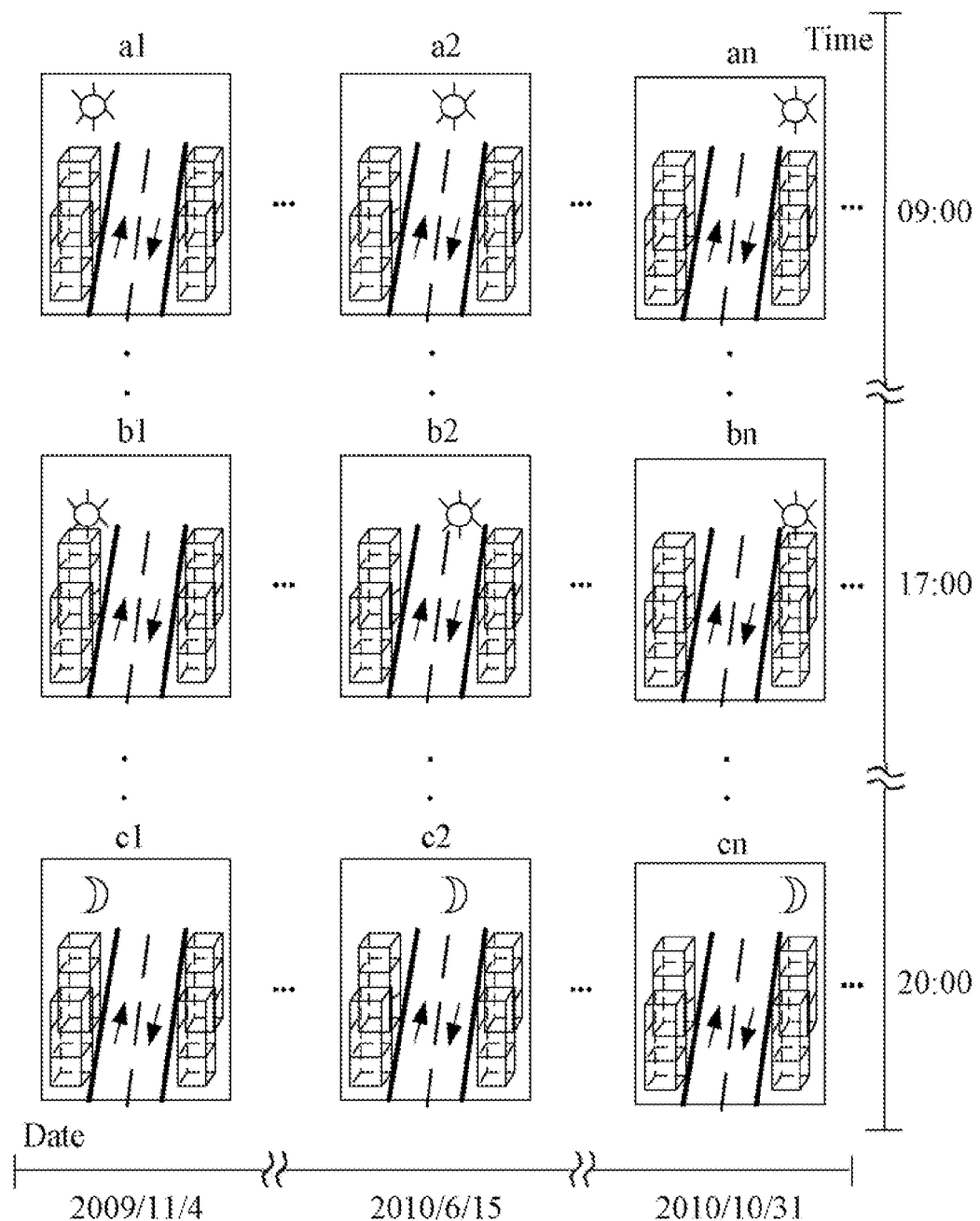
FIG. 2 is a schematic diagram illustrating an example of the panoramic images captured from the geographic region at different times of day.

The storage device 22 stores an electronic map and the series of panoramic images of the geographic region. In the embodiment, each of the panoramic images may be captured from the geographic region at different times of every day. Referring to FIG. 2, each of the panoramic images a1, a2, . . . , an corresponds to the actual scene of the geographic region at 9:00 a.m. of every day, each of the panoramic images b1, b2, . . . , bn corresponds to the actual scene of the geographic region at 17:00 p.m. of every day, and each of the panoramic images c1, c2, . . . , cn corresponds to the actual scene of the geographic region at 20:00 p.m. of every day. In other embodiments, the panoramic images can be downloaded from a network provider, such as GOOGLE Map, or GOOGLE Street View, for providing geographic information of different geographic regions, and may be stored into the storage device 22.

In one embodiment, the panorama navigation system 10 includes a route marking module 101, a navigation module 102, and an image obtaining module 103. The modules 101-103 may comprise computerized code in the form of one or more programs that are stored in the storage system 14 and executed by the processor 15 to provide functions for implementing the modules. In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives. A detailed descriptions of each modules will be given in the following paragraphs.

Figure 3:
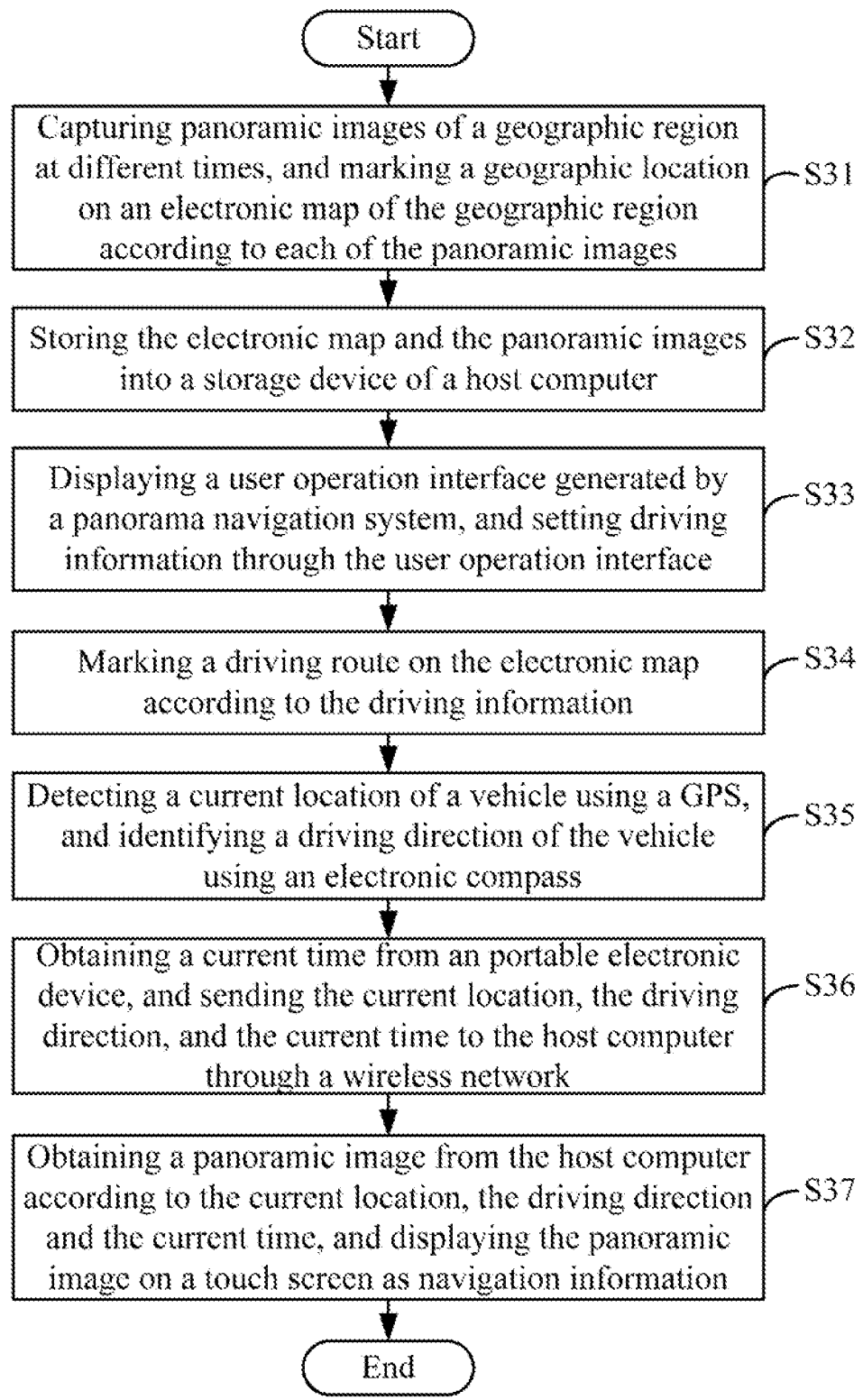
FIG. 3 is a flowchart of one embodiment of a panorama navigation method using the portable electronic device of FIG. 1.

FIG. 3 is a flowchart of one embodiment of a panorama navigation method using the portable electronic device 1 of FIG. 1. In the embodiment, the method provides panoramic navigation information of a geographic region when a driver drives a vehicle within the geographic region. Depending on the embodiment, additional blocks may be added, others removed, and the ordering of the blocks may be changed.

In block S31, the driver may capture a series of panoramic images of the geographic region at different times using a camera device, and marks a geographic location on an electronic map of the geographic region according to each of the panoramic images. In the embodiment, each of the panoramic images may be a whole image captured from the geographic region, and can reflect an actual scene around 360 degrees of the geographic region. The locations may include points of interests, such as businesses, facilities, restaurants, hotels, airports, gas stations, stadiums, and police stations, for example.

In block S32, the driver stores the electronic map and each of the panoramic images into the storage device 22 of the host computer 2 using the data transfer unit 21. In the embodiment, the driver may update the electronic map and the panoramic images at a predetermined interval, such as at every three days, for example. In other embodiments, the panoramic images can be downloaded from a network provider, such as GOOGLE Map, or a GOOGLE Street View, for providing geographic information of different geographic regions, and then updates the panoramic images stored in the storage device 22 of the host computer 2.

Figure 4:
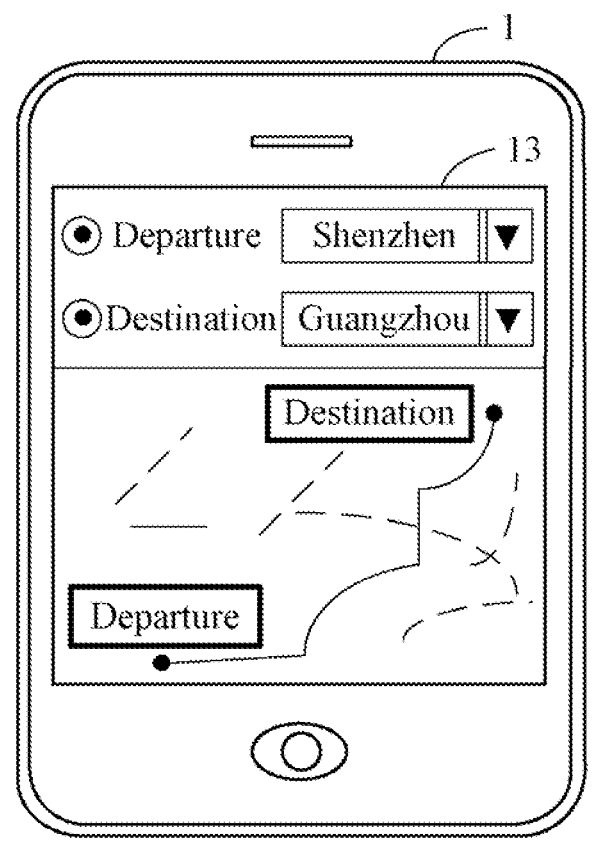
FIG. 4 is a schematic diagram illustrating an example of a arrangement of a driving route on a user operation interface of the portable electronic device.

In block S33, the route marking module 101 displays a user operation interface on the touch screen 13 of the portable electronic device 1 when the panorama navigation system 10 is activated, and receives the driving information input from the user operation interface when the driver arranges a driving route in the geographic region. In one embodiment, the driver may preset a departure and a destination of the driving route before driving a vehicle (e.g. a car, or a bus) in the geographic region. In one example as shown in FIG. 4, the departure may be set as "Shenzhen" of the geographic region, and the destination may be set as "Guangzhou" of the geographic region.

Figure 5:
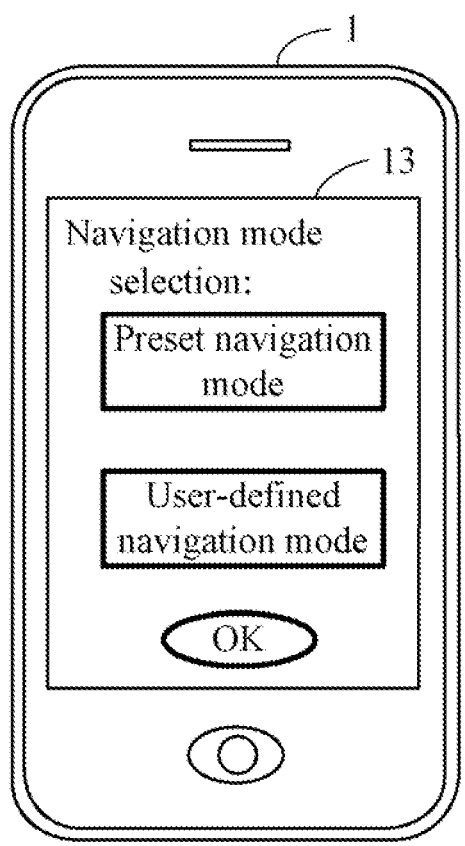
FIG. 5 is a schematic diagram illustrating an example of a selection of a navigation mode on a user operation interface of the portable electronic device.

In the embodiment, the driver can select a navigation mode from the user operation interface displayed on the touch screen 13. The navigation mode may include a preset navigation mode that is a common navigation mode set by the panorama navigation system 10, and a user-defined navigation mode that is a desired navigation mode defined by the requirements of the driver. In one example with respect to FIG. 5, if the preset navigation mode is selected, the driving route may have a short distance between the departure and the destination. If the preset navigation mode is selected, the driving route may have more highway from the departure and the destination.

In block S34, the route marking module 101 marks the driving route on the electronic map to analyze panoramic navigation information of the geographic region according to the driving information. In the embodiment, the panoramic navigation information may include a navigating map and one or more panoramic images of the geographic region.

In block S35, the navigation module 102 detects a current location of the vehicle by collecting geographic information of the geographic region using the GPS 11, and identifies a driving direction of the vehicle by detecting an orientation of portable electronic device 1 using the electronic compass 12. In the embodiment, the geographic information include longitude and latitude information of the geographic region. The orientation of portable electronic device 1 may be eastward, southward, westward, or northward.

In block S36, the navigation module 102 obtains a current time from the portable electronic device 1, and sends the current location, the driving direction and the current time to the host computer 2 through the wireless network 3. In the embodiment, the data transfer unit 21 searches a series of panoramic images of the geographic region in the storage device 22 according to the current location, the driving direction and the current time, and sends the series of panoramic images to the portable electronic device 1 through the wireless network 3.

Figure 6:
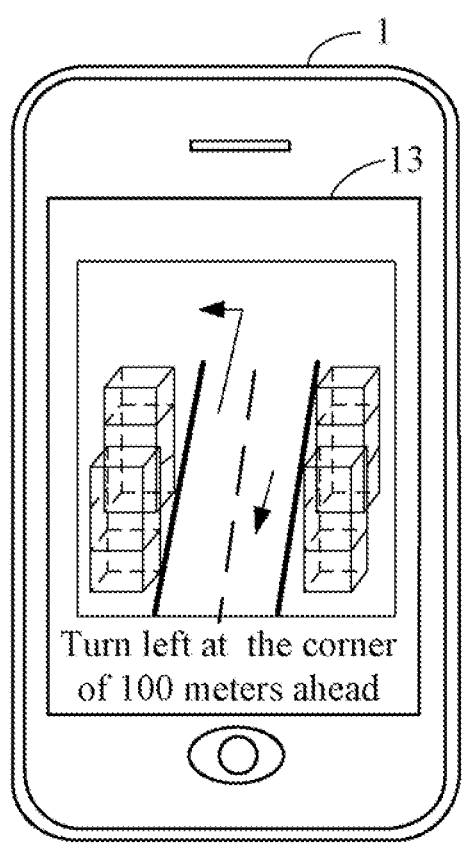
FIG. 6 is a schematic diagram illustrating an example of one or more panoramic images displayed on a touch screen of the portable electronic device.

In block S37, the image obtaining module 103 obtains the series of panoramic images from the host computer 2 through the wireless network 3, and displays the series of panoramic image on the touch screen 13 to provide panoramic navigation information for the driver. Referring to FIG. 6, if there is a corner ahead of the vehicle on the driving route, a video message "turn left at the corner 100 meters ahead", for example, may be displayed on the touch screen 13, or a voice message may be sent out by the portable electronic device 1.

All of the processes described above may be embodied in, and fully automated via, functional code modules executed by one or more general purpose processors of the electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
  a global positioning system (GPS), an electronic compass, a touch screen, a storage system, at least one processor; and
  one or more modules stored in the storage system and executable by the at least one processor, the one or more modules comprising:
  a route marking module operable to generate and display a user operation interface on the touch screen, receive driving information input from the user operation interface when a driver arranges a driving route within a geographic region, and mark the driving route on an electronic map of the geographic region to analyze panoramic navigation information of the geographic region according to the driving information;
  a navigation module operable to detect a current location of a vehicle by collecting geographic information of the geographic region using the GPS, identify a driving direction of the vehicle by detecting an orientation of the portable electronic device using the electronic compass, obtain a current time from the portable electronic device, and send the current location, the driving direction and the current time to a host computer; and an image obtaining module operable to obtain a series of panoramic images of the geographic region from the host computer according to the current location, the driving direction and the current time of the vehicle, and display the panoramic images on the touch screen to provide the panoramic navigation information for the driver, wherein each of the panoramic images corresponds to a geographic location marked on the electronic map.

2. The portable electronic device according to claim 1, wherein the user operation interface displays a selection of a navigation mode that comprises a preset navigation mode and a user-defined navigation mode.

3. The portable electronic device according to claim 1, wherein each of the panoramic images is a whole image of the geographic region that reflects an actual scene around 360 degrees of the geographic region.

4. The portable electronic device according to claim 1, wherein the host computer comprises a data transfer unit for receiving the driving information of the driving route from the portable electronic device through a wireless network, and sending the panoramic images of the geographic region to the portable electronic device through the wireless network.

5. The portable electronic device according to claim 1, wherein each of the panoramic images is captured from the geographic region using a camera device at different times, or downloaded from a network provider that provides geographic information of different geographic regions.

6. The portable electronic device according to claim 1, wherein each of the panoramic images is stored into a storage device of the host computer.

7. A panorama navigation method using a portable electronic device, the portable electronic device comprising a global positioning system (GPS), an electronic compass and a touch screen, the method comprising:
   generating and displaying a user operation interface on the touch screen, and receiving driving information input from the user operation interface when a driver arranges a driving route within a geographic region;
   marking the driving route on an electronic map of the geographic region to analyze panoramic navigation information of the geographic region according to the driving information;
   detecting a current location of a vehicle by collecting geographic information of the geographic region using the GPS;
   identifying a driving direction of the vehicle by detecting an orientation of the portable electronic device using the electronic compass;
   obtaining a current time from the portable electronic device, and sending the current location, the driving direction and the current time to a host computer;
   obtaining a series of panoramic images of the geographic region from the host computer according to the current location, the driving direction and the current time of the vehicle; and
   displaying the panoramic images on the touch screen to provide the panoramic navigation information for the driver, wherein each of the panoramic images corresponds to a geographic location marked on the electronic map.

8. The method according to claim 7, further comprising:
capturing the panoramic images of the geographic region using a camera device at different times, or downloading the panoramic images from a network provider that provides geographic information of different geographic regions; and
   marking the geographic location on the electronic map according to each of the panoramic images, and storing each of the panoramic images and the marked electronic map into a storage device of the host computer.

9. The method according to claim 7, wherein the user operation interface displays a selection of a navigation mode that comprises a preset navigation mode and a user-defined navigation mode.

10. The method according to claim 7, wherein each of the panoramic images is a whole image of the geographic region that reflects an actual scene around 360 degrees of the geographic region.

11. The method according to claim 7, wherein the host computer comprises a data transfer unit for receiving the driving information of the driving route from the portable electronic device through a wireless network, and sending the panoramic images of the geographic region to the portable electronic device through the wireless network.

12. A non-transitory computer-readable storage medium having stored thereon instructions that, when executed by at least one processor of a portable electronic device, cause the portable electronic device to perform a panorama navigation method, the portable electronic device comprising a global positioning system (GPS), an electronic compass and a touch screen, the method comprising:
   generating and displaying a user operation interface on the touch screen, and receiving driving information input from the user operation interface when a driver arranges a driving route within a geographic region;
   marking the driving route on an electronic map of the geographic region to analyze panoramic navigation information of the geographic region according to the driving information;
   detecting a current location of a vehicle by collecting geographic information of the geographic region using the GPS;
   identifying a driving direction of the vehicle by detecting an orientation of the portable electronic device using the electronic compass;
   obtaining a current time from the portable electronic device, and sending the current location, the driving direction and the current time to a host computer;
   obtaining a series of panoramic images of the geographic region from the host computer according to the current location, the driving direction and the current time of the vehicle; and
   displaying the panoramic images on the touch screen to provide the panoramic navigation information for the driver, wherein each of the panoramic images corresponds to a geographic location marked on the electronic map.

13. The storage medium according to claim 12, wherein the method further comprises:
   capturing the panoramic images from the geographic region using a camera device at different times, or downloading the panoramic images from a network provider that provides geographic information of different geographic regions; and
   marking the geographic location on the electronic map according to each of the panoramic images, and storing each of the panoramic images and the marked electronic map into a storage device of the host computer.

14. The storage medium according to claim 12, wherein the user operation interface displays a selection of a navigation mode that comprises a preset navigation mode and a user-defined navigation mode.

15. The storage medium according to claim 12, wherein each of the panoramic images is a whole image of the geographic region that reflects an actual scene around 360 degrees of the geographic region.

16. The storage medium according to claim 12, wherein the host computer comprises a data transfer unit for receiving the driving information of the driving route from the portable electronic device through a wireless network, and sending the panoramic images of the geographic region to the portable electronic device through the wireless network.

* * * * *